Figure 1A:
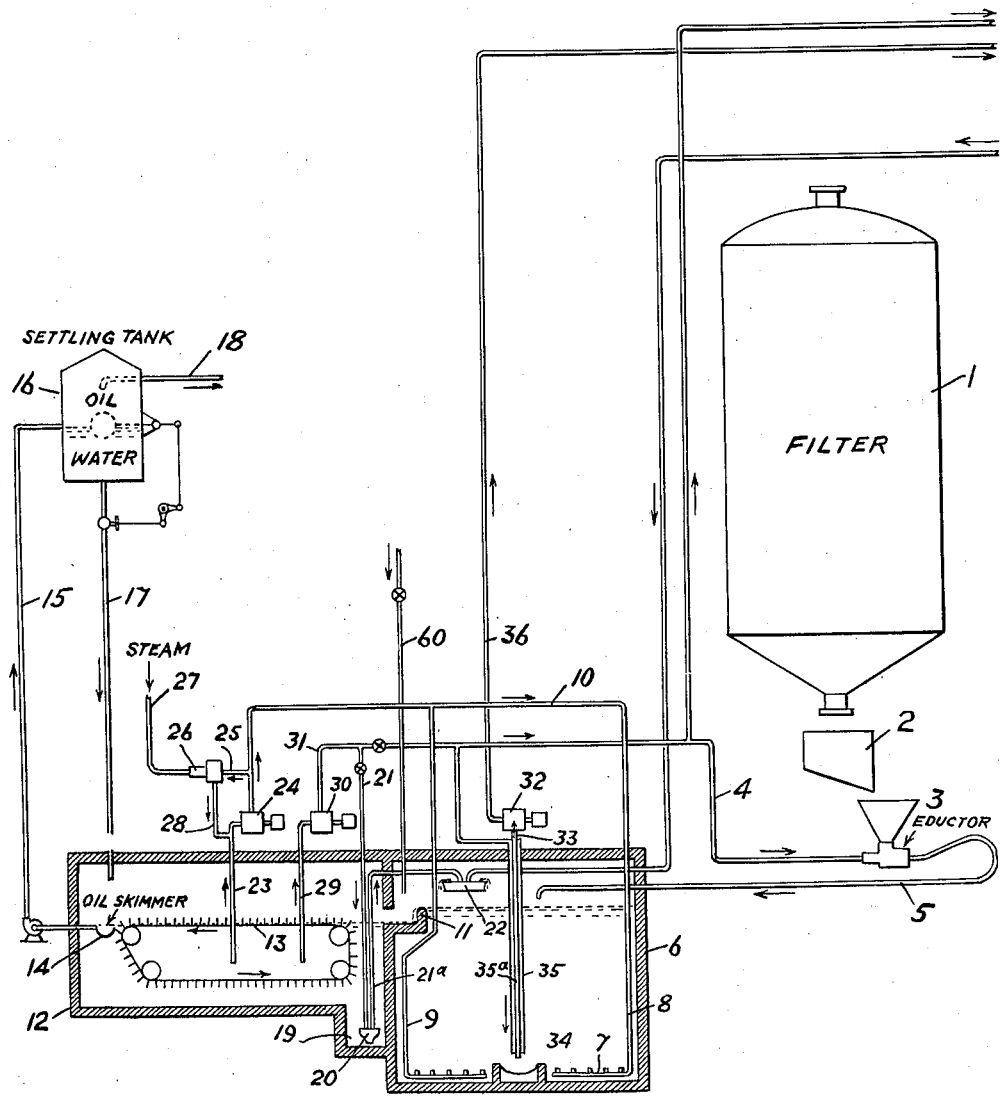
Figure 1B:
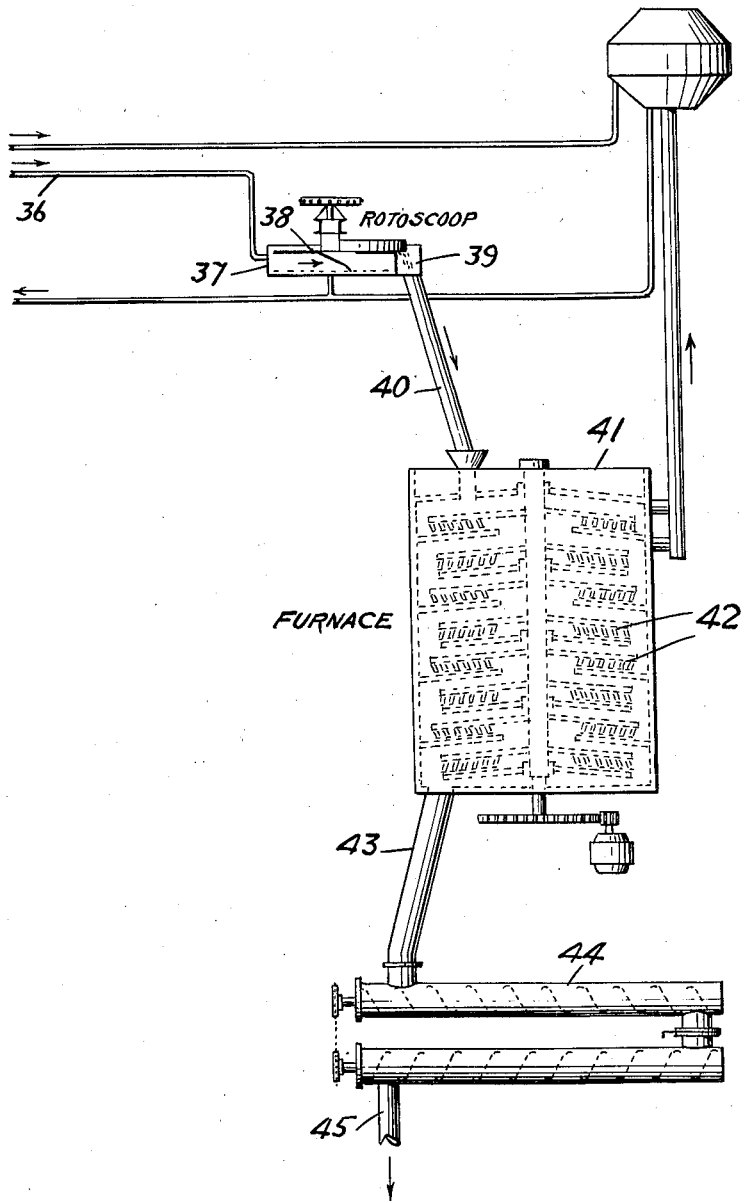

Patented May 7, 1940

2,200,145

UNITED STATES PATENT OFFICE 2,200,145

METHOD OF RECOVERING SPENT FILTER CLAY

Paul D. Barton, Chester County, Pa., assignor to Sun Oil Company, Philadelphia, Pa., a corporation of New Jersey Original application March 29, 1938, Serial No. 198,794. Divided and this application July 7, 1938, Serial No. 217,889

3 Claims. (Cl. 252—2)

The present invention relates to a process and apparatus for recovering filter clay which has been used to purify lubricating oil and more particularly to a process wherein a substantial portion of the oil adsorbed by the clay is recovered, and the clay is re-activated for further use as a filtering or contact agent.

In the final purification of lubricating oils, the oil is either filtered through fuller's earth, bentonite, or other porous adsorptive contact material, or it is mixed and agitated with such contact material in order to de-colorize the oil and, in cases where the oil has been acid treated and has not been subsequently subjected to a caustic wash, to neutralize the oils.

It is therefore an object of the present invention to treat contact materials of the clay type which have been used either as percolation or contact filtration purifying agents for lubricating oils, to recover therefrom lubricating oil which has been adsorbed by the clay, and to then revivify the clay.

Other and further objects of the invention will appear as the description progresses.

I will now briefly describe what I consider to be the best mode of practicing my invention.

The clay is mixed with hot water and passed to a leaching pit which has been previously filled with hot water having a pH value greater than 7. As soon as the pit is filled, the hot water is passed up through the clay, additional hot water flowing continuously into the pit at a multiplicity of places over the floor of the pit so as to cause a steady upflow of water through the clay at all portions of the pit. The hot water passing through the clay bed leaches oil from the clay and this mixture of oil and water, together with some fines, overflows into a separator pit having mechanical provisions for skimming the oil from the surface of the separator pit and for carrying it off, in admixture with some water, to a final oil settling tank. Some of the fines which pass over with the oil and water to the separator pit settle and are returned to the primary leaching pit by means of an eductor and are evenly distributed over the clay and water in the leaching pit so as not to cause an agitation of the clay which would break up the bed. The excess water from the separator pit is removed, heated, and passed back to the bottom of the clay leaching pit, or is used as a medium for conveying further clay to the leaching pit from the filter. After as much oil as possible has been removed from the clay by the water in the leaching pit, the clay is passed to a suitable separator for removing the major portion of the water from the clay which is then passed to a furnace where it is burned in an oxidizing atmosphere.

A furnace of the rotary hearth type, such as a Nichols-Herreshoff, is used to burn the clay. In the first one or two hearths any water left with the clay will be evaporated and will cause further oil to be steam distilled from the clay. The oil so vaporized passes off with the flue gas from the furnace which is passed to a flue gas washer where the oil is condensed and returned to the leaching pit with any fines which may be carried off by the flue gas.

From the furnace the burned clay is passed to a cooler and conveyor and, when it is properly cooled is then passed to a storage for reuse or is disposed of if not fit for further use.

A better understanding of the invention will be had by reference to the accompanying drawings, which are diagrammatic representations of one form of apparatus in which the present invention may be carried out.

I represents a filter which may be either of the percolation or contact type. 2 is a hopper into which the clay may be dumped, for feeding into an eductor 3 to which hot water heated to a temperature of say 120–200° F. is fed through line 4. Within the eductor the water from line 4 mixes with the clay and the mixture in the form of a slurry passes through line 5 to a clay leaching pit 6, the pit 6 having previously been filled with hot water of about the same temperature as that mixed with the clay in the eductor 4. The floor of the pit 6 is covered with a system of perforated pipes 7 which are fed with hot water through lines 8 and 9 from pipe 10. The water admitted from the pipes 7 passes upwardly through the clay in the pit 6 carrying with it oil from the clay and also a small amount of fines present in the clay. This admixture of water, oil and fines overflows the weir 11 and passes into the oil separator pit 12.

The oil separator pit 12 is provided with suitable means such as a continuously revolving belt 13 having raised or ribbed portions or flights thereon, for carrying the oil separating from the water and fines in pit 12 over to an oil skimmer or trough 14, from whence it is passed through line 15 to a final separating tank 16. Water is drawn from the bottom of the separator or settling tank 16 through line 17, and is returned to the system. Oil which is separated in tank 16 is withdrawn through a line 18.

The fines which settle by gravity in the pit 12 are accumulated by the flights on 13 into sump 19 from which they are picked up by means of an eductor 20 to which water from line 21 is fed. The admixture of fines and water is passed through line 21a to the weir box 22 from which it overflows into the clay leaching pit. The separated water from pit 12 is withdrawn through line 23 by means of circulating pump 24 which forces it into line 10. A portion of this water may be by-passed through line 25 to heater 26, wherein it is heated by steam admitted through line 27. This heated water is then returned to the circulating pump through line 28. A further water outlet line 29 is provided in separator pit 12. This water is withdrawn by means of pump 30 and is passed to line 31.

After as much oil as possible has been leached from the clay in pit 6 it is removed from the pit by mud pump 32, taking suction on the bottom of the pit, through line 33. Placed within the bottom of the pit 6 is a restricted trough shaped sump 34 into which water is forced through jet pipes 35 and 35a which parallel pipe 33. The water so admitted serves to mix as much water as desired with the clay and water mixture withdrawn by means of mud pump 32. It is evident that if mud pump 32 is operated at a constant speed, the more water which is added through lines 35 and 35a, the less clay will be picked up with the water passing up through line 33 to the mud pump 32. The mixture of leached clay and water passing from the mud pump is forced through line 36 to a separating device 37, wherein substantially all excess water is separated from the clay. This separator 37 may be of the type utilizing radial plows or scrapers 38 which serve to raise the clay from the bottom of the separator, dewater it by the compression caused in plowing it up, and then, by means of a vane, force it out on the peripheral ledge 39, from which it falls down chute 40 to the furnace.

The furnace 41 may be of the Nichols-Herreshoff multiple hearth type having a series of central and annular hearths set one above the other so that the clay is caused by means of rabble arms 42 to pass downwardly from one hearth to the other. Heat is supplied by burners placed between the hearths, and additional air may be admitted from the central shaft which is hollow. By this means the atmosphere in the furnace is controlled so that there is an oxidizing atmosphere since in accordance with the present invention it is desired to burn as much oil as possible from the clay in order to render it fit for re-use. The bottom hearth of the furnace is air cooled so that the clay is partially cooled before it leaves the furnace.

From the furnace the clay passes through a chute 43 to a screw conveyor and cooler 44. This conveyor and cooler is of the ordinary screw conveyor type, but is furnished with a jacket through which cold air may be blown or through which cooling water may be circulated. From the final pass of the conveyor and cooler 44, the cooled reactivated clay is removed through pipe or chute 45 and passed to storage.

Strict conditions for the operation of the present process cannot be set forth, due to the differences in filter media and in the oil treated. However, the following will serve as an example:

The clay is mixed with water having a temperature of from 120–200° F. in the eductor 3, and is passed to the leaching pit 6, which has previously been filled with water at about the same temperature. The clay settles to the bottom of the pit and when a sufficient charge has been placed therein, heated water is admitted to the perforated pipes 7. This water is also from 120–200° F. and has a pH value of about 8, since it has been discovered that if the water is neutral or on the acid side it will not properly leach the clay, as the clay is somewhat acid due to the presence of sulphur compounds in the oil. The alkalinity is obtained by the addition of sodium hydroxide or other alkaline material to the water through valved line 60. By regulating the temperature and pH value of the water the amount of oil which will be leached from the clay can be controlled within desired limits, an increase in either or both the temperature or alkalinity of the water serving to increase the amount of oil which will be leached from the clay. As a general rule the temperature chosen for the water will be that temperature at which the oil being filtered is passed through the filter. Thus when the clay which is being processed in accordance with the present invention is obtained from a filter which has been handling a light oil, which flows freely at a low temperature, the oil will be at a relatively low temperature and therefore the water used may be at a correspondingly low temperature; while if the clay is obtained from a filter which has been handling a heavy oil, which was heated to a relatively high degree in order to make it flow freely through the filter, the water used for leaching will preferably be heated to a correspondingly high degree. The viscosity of the oil in the clay and also the time that the clay remains in the leaching pit 6 also affect the amount of oil which will be leached from the clay. Thus, due to the number of variables in the process, it is impossible to give exact optimum operating conditions; however, the optimum conditions can readily be determined for any particular raw material and product.

The water introduced into the bottom of pit 6 through perforated pipes 7, percolates up through the clay evenly, and without channeling, carrying with it the oil which it removes from the clay during its passage. A certain amount of clay fines are also carried upward by the water and oil and the mixture pumped as heretofore explained to the separator 37. The amount of oil removed from the clay varies with the viscosity and other characteristics of the oil adsorbed by the clay, and also with the use to which the clay is to be put after further treatment.

As a general rule, approximately 80% of the contained oil may be recovered when operating in accordance with the present invention and the thus de-oiled clay may be burned in the furnace 41 at a temperature of approximately 1000° F. or slightly higher. If the clay is to be revivified, the temperature is carefully controlled so as not to harm the clay, but if the clay is merely to be disposed of as waste it may be burned at a higher temperature and thus hasten the burning process, giving the furnace 41 a larger throughput.

If it is desired to use the fines which collect in the sump 19 of the settling pit 12, these fines instead of being returned to the tray 22 and thence back to the leaching pit 6, may be conveyed to a suitable settling apparatus and the fines then settled, either by gravity or by other means, or, if desired, the mixture of fines picked up by the eductor 20 may be passed to filtering or centrifugal separating means for separation. These fines are then dried, preferably in the furnace 41 and may be used as such for carrying agent for insecticides. In some cases it may be advisable to continuously furnish fresh water to the eductor 3 instead of water which is recirculated from the settling pit 12. In this case the waste water passing out through line 29 may contain some fines which can be recovered by settling or other means as disclosed above. These fines, it will be found, will also serve after drying, and usually without grinding, as carrying agent for insecticides.

The present application is directed to the use of my method of leaching oil from clay to recover as much oil as possible from the clay followed by burning the clay, from which as much oil as possible has been removed, in an oxidizing atmosphere to revivify the clay. I do not herein claim broadly the method disclosed above of controlling the amount of oil which is permitted to remain in the clay since such method forms the subject matter of, and is claimed in, my copending application, Serial No. 198,794, filed March 29, 1938, of which this application is a division. Nor do I, in the present application claim any method involving the burning of clay from which oil has been removed by my leaching method in a reducing atmosphere since such subject matter is claimed in the copending application Serial No. 217,888, filed July 7, 1938 which is likewise a division of my above mentioned application Serial No. 198,794, filed March 29, 1938.

What I claim and desire to protect by Letters Patent is as follows:

1. The process for the reclamation of used filter clay comprising mixing the clay with water having a pH value greater than 7, introducing said mixture of clay and water into a zone of leaching and agitation; therein passing water through said clay to agitate it and leach oil therefrom, flowing water containing leached out oil and suspended clay fines from said zone of leaching and agitation into a settling zone, therein permitting said clay fines to settle out and said oil to separate from said water; skimming oil from the surface of said water in said settling zone and introducing the skimmed off oil into a separating zone, therein separating said oil from any water remaining therein, removing said settled clay fines from said settling zone and returning them to said zone of leaching and agitation; removing clay from said zone of leaching and agitation to a burning zone and therein burning it in an oxidizing atmosphere.

2. The process for the reclamation of used filter clay comprising mixing the clay with water having a pH value greater than 7, introducing said mixture of clay and water into a zone of leaching and agitation, therein passing water through said clay to agitate it and leach oil therefrom; flowing water containing leached out oil and suspended clay fines from said zone of leaching and agitation into a settling zone, therein permitting said clay fines to settle out and said oil to separate from said water; skimming oil from the surface of said water in said settling zone and introducing the skimmed off oil into a separating zone, therein separating said oil from any water remaining therein; removing said settled clay fines from said settling zone and returning them to said zone of leaching and agitation; removing water from said settling zone and utilizing it as the water specified in said leaching step; removing clay from said zone to leaching and agitation to a burning zone and therein burning it in an oxidizing atmosphere.

3. The process for the reclamation of used filter clay comprising mixing the clay with water having a pH value greater than 7, introducing said mixture of clay and water into a zone of leaching and agitation, therein passing water through said clay to agitate it and leach oil therefrom; flowing water containing leached out oil and suspended clay fines from said zone of leaching and agitation into a settling zone, therein permitting said clay fines to settle out and said oil to separate from said water; skimming oil from the surface of said water in said settling zone and introducing the skimmed off oil into a separating zone, therein separating said oil from any water remaining therein; removing said settled clay fines from said settling zone and returning them to said zone of leaching and agitation, removing clay from said zone of leaching and agitation, mechanically separating the major portion of water from said clay, drying the thus dewatered clay by passing a heated gas thereover to thereby vaporize the remaining water and distill off a portion of the remaining oil, burning the thus dried clay in an oxidizing atmosphere and utilizing the products of combustion from said burning step as the hot gas specified in said drying step.

PAUL D. BARTON.